Patented Oct. 12, 1937

2,095,577

UNITED STATES PATENT OFFICE 2,095,577

ASYMMETRIC ARSENO COMPOUNDS

Karl Streitwolf, Frankfort-on-the-Main, Alfred Fehrle, Bad-Soden in Taunus, and Walter Herrmann, Frankfort-on-the-Main, Germany, assignors to Winthrop Chemical Company, Inc., New York, N. Y., a corporation of New York No Drawing. Application December 23, 1930, Serial No. 504,414. Renewed March 2, 1937. In Germany July 22, 1930

6 Claims. (Cl. 260—15)

The present invention relates to asymmetric arseno compounds, more particularly to compounds of the following general formula $$X-As=As-Y-O-CH_2-COO-Z$$

wherein X stands for an aryl radical, Y stands for an aryl or aryl-imidazole radical, which radicals X and Y may be substituted, in every case at least one of the radicals X and Y containing as a substituent of the aryl nucleus a substituted amino group and Z stands for hydrogen or an alkali metal.

Arsenobenzene derivatives, which are used as a remedy have been transformed into water-soluble preparations of neutral reaction. The compounds thus obtained have a good action when intravenously injected, but they are not tolerated when subcutaneously or intramuscularly injected, on account of the very strongly irritating effect.

Now we have found that compounds of general application are made by reducing to asymmetric arsenobenzenes phenoxy-acetic acid-arsonic acids or aryl-arsonic acids which have an imidazole ring containing glycolic acid as substituent, together with other therapeutically active aryl-arsonic acids, or by producing the asymmetric arsenobenzenes according to known methods from the derivatives of the corresponding arsonic acids containing trivalent arsenic and in cases in which the product to be obtained contains a primary amino group or groups, acylating such group or groups or causing the arsenobenzene to react with compounds capable of condensing with a primary amino group, such as formaldehyde-bisulfite or glycide.

These new compounds have, as is required in modern therapy, a good action when intravenously, subcutaneously or intramuscularly injected and are well tolerated.

The following examples illustrate the invention, but they are not intended to limit it thereto:

(1) 7.4 grams of 4-acetylamino-2.3-dimethyl-1-phenyl-5-pyrazolone-para-arsonic acid and 6.6 grams of 1-methyl-2-oxy-acetic acid-benzimidazol-5-arsonic acid (obtained by causing 1-methylbenzimidazolone-5-arsonic acid to act upon mono-chloracetic acid) are mixed with 10 grams of sodium acetate and 6 grams of potassium iodide. The mixture is reduced at 60° C. in 84 cc. of glacial acetic acid by means of 24 cc. of hypophosphorous acid of 25 per cent. strength. The arsenic compound thus formed is filtered by suction and washed and then stirred with 50 cc. of methyl alcohol; 70 cc. of water are added and the whole is dissolved by addition of 2N-sodium carbonate solution. By introducing the filtered solution, while stirring, into 10 parts by volume of acetone the solid preparation is caused to separate in the form of a yellow powder which dissolves in water to a clear and neutral solution. The product obtained has the following formula:

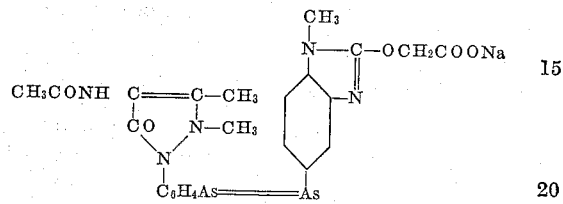

(2) 7.25 grams of 2-methyl-4-phenoxyacetic acid-1-arsonic acid, obtained by causing 2-methyl-4-hydroxy-benzene-arsonic acid to act upon monochloracetic acid, are dissolved in 28 cc. of 2N-caustic soda solution and 28 cc. of water. To this solution is added a solution of 6.87 grams of 3-acetylamino-4-hydroxybenzene-1-arsonic acid in 15.5 cc. of 2N-caustic soda solution and 15.5 cc. of water. The filtered mixture is diluted with 250 cc. of water and then reduced at 65° C., while stirring, by means of 98 grams of hydrosulfite. The arsenic compound filtered by suction is made into a paste with 150 cc. of methyl alcohol and dissolved by addition of 50 cc. of water at 50° C. By introducing the filtered solution, while stirring, into 10 parts of acetone the desired compound is caused to separate. It dissolves in water to a clear and neutral solution. The product obtained has the following formula:

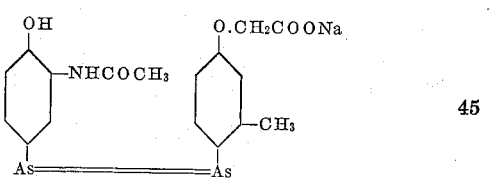

(3) 6 grams of 3-hydroxybenzaldehyde-semicarbazone-4-arsonic acid and 6.7 grams of 3- acetylamino-4-phenoxyacetic acid-1-arsonic acid (obtained by causing 3-acetylamino-4-hydroxybenzene-arsonic acid to act upon monochloracetic acid) are mixed with 10 grams of sodium acetate and 6 grams of potassium iodide and the mixture is reduced at 60° C. in 84 cc. of glacial acetic acid by means of 24 cc. of hypophosphorous acid of 25 per cent. strength. The arsenic compound, washed with water, is made into a paste with 50 cc. of methyl alcohol and, after addition of 150 cc. of water, dissolved by addition of 2N-caustic soda solution. By introducing the filtered solution, while stirring, into 10 parts of acetone and subsequent addition of 5 parts of ether, the desired compound is caused to separate. The product obtained has the following formula:

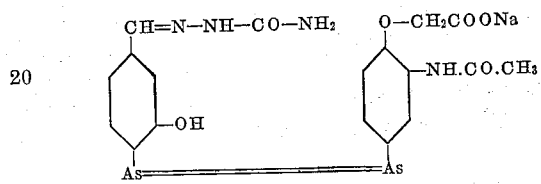

(4) 4.7 grams of 3-amino-4-hydroxybenzene-arsonic acid and 5.8 grams of 3-methyl-4-phenoxy-acetic acid-1-arsonic acid, obtained by causing 3-methyl-4-hydrobenzene-arsonic acid to act upon monochloracetic acid, are reduced by means of 24 cc. of hypophosphorous acid as indicated in Example 1. The separated and washed arsenic compound is suspended in 20 cc. of methyl alcohol and 50 cc. of water and the suspension is stirred, while it is heated in the water bath at 50° C., after addition of 6 grams of sodium formaldehyde-bisulfite and 10 cc. of 2N-caustic soda solution, until a test portion can no longer be diazotized. The solution is neutralized by means of 2N-acetic acid and filtered. By introducing the filtrate, while stirring, into 10 parts by volume of absolute alcohol and subsequently adding 3.3 parts of ether, the desired compound is caused to separate. It dissolves in water to a clear and neutral solution. The product obtained has the following formula:

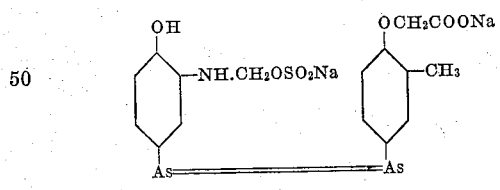

(5) 11.6 grams of 3-amino-4-hydroxybenzene-arsonic acid are dissolved in 31 cc. of 2N-caustic soda solution and 31 cc. of water and a solution of 16.5 grams of 1-methyl-2-oxyacetic acid-benzimidazole-5-arsonic acid (cf. Example 1) in 56 cc. of 2N-caustic soda solution and 56 cc. of water is added thereto. The filtered mixture is diluted with 500 cc. of water and reduced at 65° C. by means of hydrosulfite. The washed arsenic compound is made into a paste with 200 cc. of methyl alcohol, 150 cc. of water at 50° C. are added thereto and the whole is filtered. By introducing the filtrate, while stirring, into 10 parts by volume of acetone the desired compound is caused to separate in a solid form. It dissolves in water to a clear and neutral solution. For the transformation by formaldehyde-bisulfite, 22 grams of the arsenic compound thus obtained are dissolved in 110 cc. of water, 15 grams of sodium formaldehyde-bisulfite are added thereto and the whole is stirred at 50° C. until a test portion can no longer be diazotized. The filtered solution is introduced while stirring into 10 parts of alcohol and the precipitated product is filtered by suction. The compound dissolves in water to a clear and neutral solution. The product obtained has the following formula:

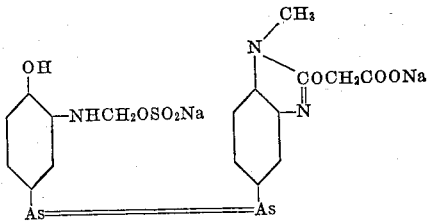

(6) 13.7 grams of 3-acetylamino-4-hydroxybenzene-arsonic acid, dissolved in 31 cc. of 2N-caustic soda solution and 31 cc. of water, are mixed with a solution of 16.6 grams of 3-acetyl-amino-4-phenoxy-acetic acid-1-arsonic acid in 56 cc. of 2N-caustic soda solution and 56 cc. of water and the mixture is reduced at 65° C., after addition of 500 cc. of water, by means of 195 grams of hydrosulfite. The separated arsenic compound is made into a paste with 150 cc. of methyl alcohol and 75 cc. of water at 50° C. are added thereto. By introducing the filtered solution, while stirring into 5 parts by volume of acetone the desired compound is caused to separate in a solid form. It dissolves in water to a clear and neutral solution. The product obtained has the following formula:

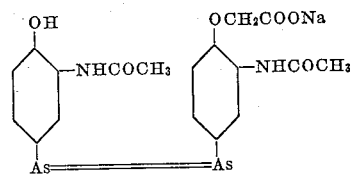

(7) A mixture of 8.25 grams of 1-methyl-2- oxyacetic acid-benzimidazol-5-arsonic acid, dissolved in 28 cc. of 2N-caustic soda solution and 28 cc. of water, and 6.8 grams of 1-methylbenzimidazolone-5-arsonic acid, dissolved in 15.5 cc. of 2N-caustic soda solution and 15.5 cc. of water, is, after addition of 250 cc. of water, reduced at 65° C. by means of 98 grams of hydrosulfite. The separated arsenic compound is dissolved in 70 cc. of methyl alcohol and 70 cc. of water. The filtered solution is introduced, while stirring, into 10 parts by volume of acetone and the compound thus caused to separate is filtered by suction. It dissolves in water to a clear and neutral solution. The product obtained has the following formula:

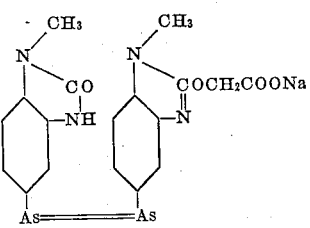

(8) 7.25 grams of 2-methyl-4-phenoxyacetic acid-arsonic acid and 7.2 grams of 4-amino-2,3-dimethyl-5-pyrazolone - 1 - phenyl-para-arsonic acid are dissolved respectively in 28 cc. of 2N-caustic soda solution and 28 cc. of water and in 15.5 cc. of 2N-caustic soda solution and 15.5 cc.

of water. 250 cc. of water are added to the combined solutions. The mixture is reduced at 65° C. by means of 98 grams of hydrosulfite. The separated arsenic compound is dissolved in 50 cc. of methyl alcohol and 150 cc. of water at 50° C. By introducing the solution, while stirring, into 10 parts by volume of acetone the solid compound is caused to separate. It dissolves in water to a clear and neutral solution.

The product is transformed by formaldehyde-bisulfite by dissolving 9 grams of it in 25 cc. of methyl alcohol and 50 cc. of water, and adding 6 grams of sodium formaldehyde-bisulfite to the solution. The whole is stirred at 50° C. until a test portion is no longer diazotizable. The filtered solution is introduced, while stirring, into 10 parts by volume of absolute alcohol. The precipitated product dissolves in water to a clear and neutral solution. The product obtained has the following formula:

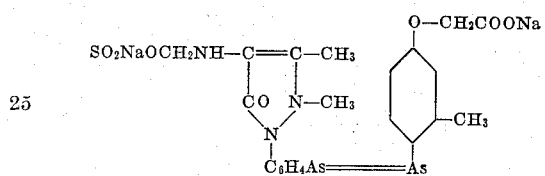

(9) 16.6 grams of 3-acetylamino-4-phenoxy-acetic acid-1-arsonic acid, dissolved in 56 cc. of 2N-caustic soda solution and 56 cc. of water, and 16.4 grams of 4-amino-2.3-dimethyl-5-pyrazolone-1-phenyl-para-arsonic acid, dissolved in 31 cc. of 2N-caustic soda solution and 31 cc. of water are mixed together and, after addition of 500 cc. of water the mixture is reduced by means of 195 grams of hydrosulfite. The separated arsenic compound is dissolved in 150 cc. of methyl alcohol and 75 cc. of water at 50° C. and filtered. By introducing the filtrate, while stirring, into 5 parts by volume of acetone, the product separates in a solid form.

17 grams of this compound are dissolved in 80 cc. of water and 9 grams of sodium formaldehyde-bisulfite are added. The whole is then stirred at 50° C. until a test portion can no longer be diazotized. The filtered solution is introduced, while stirring, into 10 parts of methyl alcohol and 5 parts of ether are added thereto. The solid product, filtered by suction, dissolves in water to a clear and neutral solution. The product obtained has the following formula:

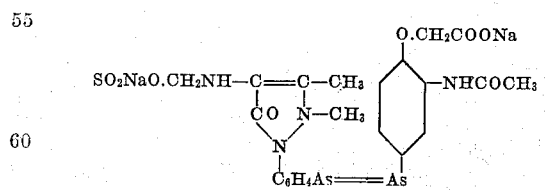

(10) A mixture of 6.6 grams of 1-methyl-2-oxy-acetic acid-benzimidazol-5-arsonic acid and 5.8 grams of 2-methyl-4-phenoxyacetic acid-1-arsonic acid in 84 cc. of glacial acetic acid is reduced by means of 24 cc. of hypophosphorous acid as indicated in Example 1. The separated arsenic compound is introduced, while stirring, into 50 cc. of water and dissolved by addition of 2N-sodium carbonate. By introducing the filtered solution, while stirring, into 10 parts by volume of acetone, the solid product is caused to separate. It dissolves in water to a clear and neutral solution. The product obtained has the following formula:

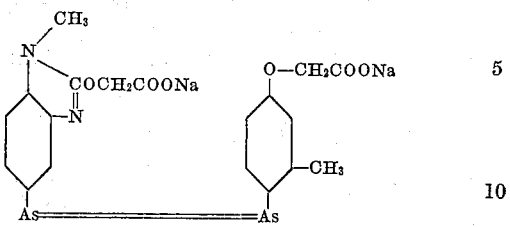

(11) 8.25 grams of 1-methyl-2-oxy-acetic acid-benzimidazol-5-arsonic acid, dissolved in 28 cc. of 2N-caustic soda solution and 28 cc. of water, and 6.9 grams of 3-acetyl-amino-4-hydroxybenzene-1-arsonic acid, dissolved in 15.5 cc. of 2N-caustic soda solution and 15.5 cc. of water, are mixed together and, after addition of 250 cc. of water, the mixture is reduced at 65° C. by means of 98 grams of hydrosulfite. The isolated arsenic compound is dissolved in 50 cc. of methyl alcohol and 70 cc. of water and the solution is neutralized with 2N-acetic acid. The filtered solution is introduced, while stirring, into 10 parts by volume of alcohol and the product which has separated is filtered by suction. It dissolves in water to a neutral and clear solution. The product obtained has the following formula:

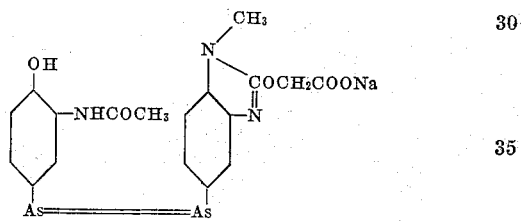

(12) 16.6 grams of 4-acetylamino-2-phenoxy-acetic acid-1-arsonic acid, obtained by reaction between 2-hydroxy-4-acetyl-aminobenzene-1-arsonic acid and monochlor-acetic acid, are dissolved in 56 cc. of 2N-caustic soda solution and 56 cc. of water. 13.7 grams of 3-acetylamino-4-hydroxybenzene-1-arsonic acid are dissolved in 31 cc. of 2N-caustic soda solution and 31 cc. of water. The combined solutions are diluted with 500 cc. of water and reduced at 65° C. by means of 195 grams of hydrosulfite. The separated arsenic compound is made into a paste with 75 cc. of methyl alcohol and dissolved by addition of water at 50° C. The filtered solution is introduced, while stirring, into 5 parts by volume of acetone and the product which has separated is filtered by suction. It dissolves in water to a clear and neutral solution. The product obtained has the following formula:

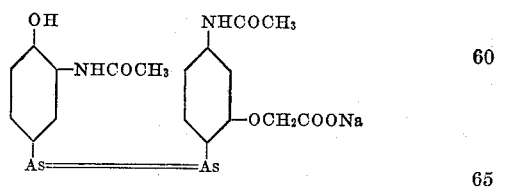

(13) A mixture of 17 grams of the sodium salt of 4-(4″-amino-2″.3″-dimethyl-5″-pyrazolone-1″-yl)-3′-acetylamino-4′-oxyacetic acid-arsenobenzene and 68 cc. of methyl alcohol obtained as described in the first part of Example 9, is stirred in the water bath at 65° C. together with 9.6 cc. of glycide and a small quantity of water until a test sample can no longer be diazotized. The solution thus obtained is filtered and the filtrate is introduced, while stirring, into 10 parts of alcohol. After addition of 5 parts of ether, the precipitate thus produced is filtered by suction. The compounds dissolves in water to a clear and neutral solution. The reaction proceeds according to the following equation:

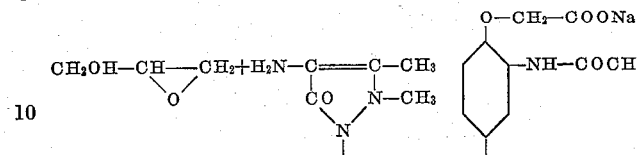

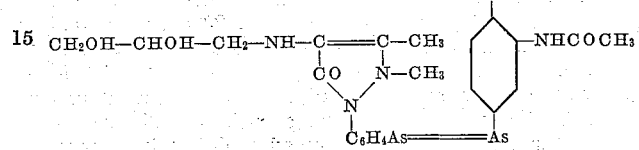

(14) 6.6 grams of 1-methyl-2-oxyacetic acid-benzimidazol-5-arsonic and 6 grams of 3-hydroxy-benzaldehyde-semi-carbazone - 4 - arsonic acid are reduced with hypophosphorous acid as indicated in Example 1. The arsenic compound is suspended in 170 cc. of water and 50 cc. of methyl alcohol and dissolved by addition of 2N-caustic soda solution. The filtered solution is introduced, while stirring, into 10 parts by volume of acetone and the compound which separates is filtered by suction. It dissolves in water to a neutral solution. The product obtained has the following formula:

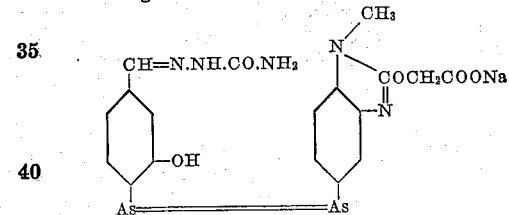

(15) 5.8 grams of 3-methyl-4-phenoxy-acetic acid-1-arsonic acid and 6.7 grams of 3-acetyl-amino-4-phenoxy-acetic acid-1-arsonic acid are reduced as indicated in Example 1. A paste is made of the arsenic compound and 50 cc. of water and is dissolved by addition of 2N-sodium carbonate solution. The filtered solution is introduced, while stirring, into 10 parts by volume of acetone and the compound which separates is filtered by suction. It dissolves in water to a neutral solution. The product obtained has the following formula:

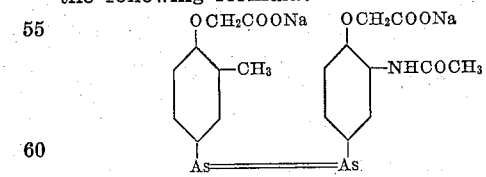

(16) 16.4 grams of 4-amino-2.3-dimethyl-5-pyrazolone-1-phenyl-para-arsonic acid, dissolved in 31 cc. of 2N-caustic soda solution and 31 cc. of water, and 16.5 grams of 1-methyl-2-oxy-acetic acid-benzimidazol-5-arsonic acid, dissolved in 56 cc. of 2N-caustic soda solution and 56 cc. of water, are mixed and after addition of 500 cc. of water the mixture is reduced by means of 195 grams of hydrosulfite. The separated arsenic compound is introduced, while stirring, into 100 cc. of methyl alcohol and dissolved by addition of 100 cc. of water at 50° C. In order to separate the product, the filtered solution is introduced, while stirring, into 10 parts of alcohol and 4 parts of ether are added thereto. The compound dissolves in water to a clear solution.

15 grams of the arsenic compound thus obtained are dissolved in 75 cc. of water and 6 grams of sodium formaldehyde-bisulfite are added. The whole is stirred at 50° C. until a test portion can no longer be diazotized. The filtered solution is then introduced, while stirring, into 10 parts by volume of alcohol and the compound which has separated is filtered by suction. It dissolves in water to a clear and neutral solution. The product obtained has the following formula:

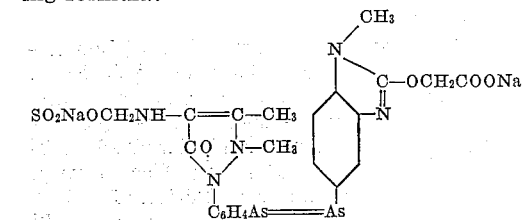

(17) A mixture of 8.2 grams of 4-amino-2.3-dimethyl-5-pyrazolone - 1 - phenyl-para-arsonic acid, dissolved in 15.5 cc. of 2N-caustic soda solution and 15.5 cc. of water, and 7.25 grams of 3-methyl-4-phenoxy-acetic acid-1-arsonic acid, dissolved in 28 cc. of 2N-caustic soda solution and 28 cc. of water, is, after addition of 250 cc. of water, reduced by means of 98 grams of hydrosulfite. The separated arsenic compound is stirred with 100 cc. of methyl alcohol and dissolved by addition of 70 cc. of water at 50° C. The filtered solution is introduced, while stirring, into 10 parts by volume of acetone. The arsenic compound which separates dissolves in water to a clear and neutral solution.

10 grams of this arsenic compound are dissolved in 25 cc. of methyl alcohol and 50 cc. of water and transformed at 50° C. by means of 6 grams of sodium formaldehyde-bisulfite. The filtered solution is introduced, while stirring, into 10 parts by volume of absolute alcohol in order to precipitate the product in a solid form. The product dissolves in water to a neutral solution. The product obtained has the following formula:

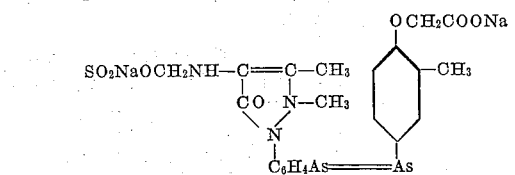

(18) 5.9 grams of 2-methyl-4-glycolylamino-benzene-1-arsonic acid and 6.6 grams of 1-methyl-2-oxyacetic acid-benzimidazol-5-arsonic acid are reduced as indicated in Example 1. The separated arsenic compound is stirred with 50 cc. of methyl alcohol and dissolved, after addition of a small quantity of water, by means of 2N-sodium carbonate solution. The solid compound is caused to separate from the filtered solution by introducing the latter, while stirring, into 5 parts by volume of acetone. It dissolves in water to a neutral solution. The product obtained has the following formula:

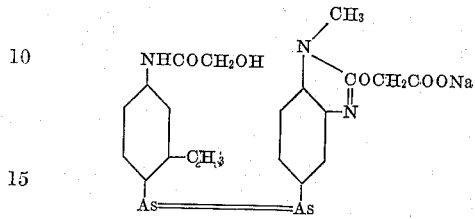

(19) 6.8 grams of 2-hydroxy-methylbenzimidazol-5-arsonic acid dissolved in 15.5 cc. of 2N-caustic soda solution and 15.5 cc. of water, and 8.25 grams of 1-methyl-2-oxy-acetic acid-benzimidazol-5-arsonic acid, dissolved in 28 cc. of 2N-caustic soda solution and 28 cc. of water, are mixed together and, after addition of 250 cc. of water, the mixture is reduced by means of 98 grams of hydrosulfite. The separated arsenic compound is stirred with 150 cc. of methyl alcohol and dissolved by addition of 100 cc. of water at 50° C. The solution is introduced, while stirring, into 10 parts by volume of acetone. The compound dissolves in water to a clear and neutral solution. The product obtained has the following formula:

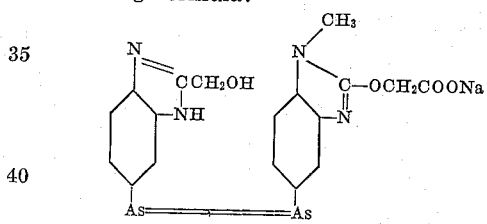

(20) To a solution of 15 grams of 3-acetylamino-4-phenoxy-acetic acid-1-arsine oxide (prepared by reducing the 3-acetylamino-4-phenoxy-acetic acid-1-arsonic acid with sulfur dioxide in presence of hydrogen iodide in 1 liter of dilute acetic acid) is added a solution of 11.5 grams of 3-acetylamino-4-hydroxy-benzenearsine in 120 cc. of dilute acetic acid, the whole is heated for a short time, the arsenobenzene which is identical with that obtained according to Example 6 is filtered by suction and transformed, as indicated, into the sodium salt.

The 3-acetylamino-4-hydroxybenzenearsine is prepared by acetylating the 3-amino-4-hydroxybenzenearsine. The product obtained has the following formula:

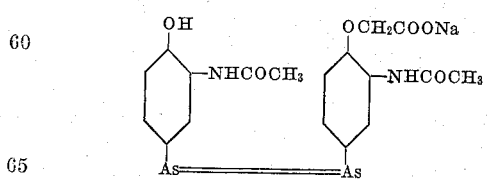

We claim:
1. The asymmetric arsenic compounds of the following formula:

X—As=As—Y—O—CH$_2$—COOZ wherein X and Y stand for benzene radicals, at least one of the radicals X and Y containing as a substituent of the aryl nucleus an amino group substituted by acyl, and Z stands for an alkali metal, readily dissolving in water to neutral solutions of good efficacy and tolerability when applied intravenously, subcutaneously or intramuscularly.

2. The asymmetric arsenic compounds of the following formula:

C$_6$Y$_5$As=As.C$_6$X$_4$.O.CH$_2$.COOZ wherein one X stands for acylamino, one other X for alkyl, hydroxy, acylamino, the remaining X's stand for hydrogen, one Y stands for acylamino, one other Y for alkyl, hydroxy, acylamino, the remaining Y's stand for hydrogen, and Z stands for an alkali metal, readily dissolving in water to neutral solutions of good efficacy and tolerability when applied intravenously, subcutaneously or intramuscularly.

3. The asymmetric arsenic compounds of the following formula:

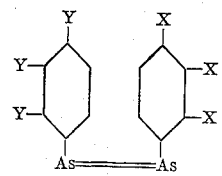

wherein one X stands for —O—CH$_2$—COONa, one further X for acetylamino and the remaining X for hydrogen, and Y stands for hydrogen, hydroxy or acetylamino, readily dissolving in water to neutral solutions of good efficacy and tolerability when applied intravenously, subcutaneously or intramuscularly.

4. The asymmetric arsenic compounds of the following formula:

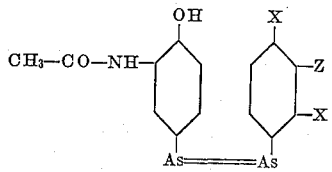

wherein one X stands for —O—CH$_2$—COONa, Z stands for acetylamino or hydrogen, the other X stands for hydrogen or acetylamino, in which latter case Z stands for hydrogen only, readily dissolving in water to neutral solutions of good efficacy and tolerability when applied intravenously, subcutaneously or intramuscularly.

5. The compound of the following formula

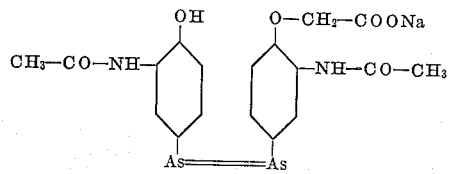

readily dissolving in water to neutral solutions of good efficacy and tolerability when applied intravenously, subcutaneously or intramuscularly.

6. The compound of the following formula

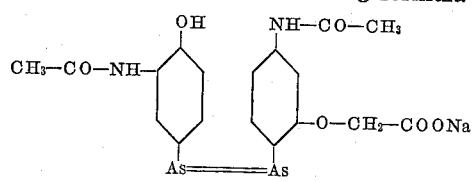

readily dissolving in water to neutral solutions of good efficacy and tolerability when applied intravenously, subcutaneously or intramuscularly.

KARL STREITWOLF.
ALFRED FEHRLE.
WALTER HERRMANN.